United States Patent
Walston

(10) Patent No.: US 8,839,227 B2
(45) Date of Patent: Sep. 16, 2014

(54) PREVENTING OVERWRITE OF NONESSENTIAL CODE DURING ESSENTIAL CODE UPDATE

(75) Inventor: Allen Walston, Sandy Springs, GA (US)

(73) Assignee: ARRIS Enterprises, Inc., Suwanee, GA (US)

( * ) Notice: Subject to any disclaimer, the term of this patent is extended or adjusted under 35 U.S.C. 154(b) by 1162 days.

(21) Appl. No.: 12/396,154

(22) Filed: Mar. 2, 2009

(65) Prior Publication Data

US 2009/0222810 A1    Sep. 3, 2009

Related U.S. Application Data

(60) Provisional application No. 61/032,674, filed on Feb. 29, 2008.

(51) Int. Cl.
*G06F 9/445* (2006.01)
*G06F 11/14* (2006.01)

(52) U.S. Cl.
CPC .......... *G06F 11/1433* (2013.01); *G06F 8/665* (2013.01)

USPC .......... 717/172; 717/168; 717/169; 717/170; 717/171

(58) Field of Classification Search
None
See application file for complete search history.

(56) References Cited

U.S. PATENT DOCUMENTS

| | | | |
|---|---|---|---|
| 7,100,011 B2 * | 8/2006 | Winters et al. | 711/165 |
| 7,278,002 B2 * | 10/2007 | Winters et al. | 711/165 |
| 2003/0167373 A1 * | 9/2003 | Winters et al. | 711/103 |
| 2004/0255283 A1 * | 12/2004 | Rudelic et al. | 717/151 |
| 2006/0080650 A1 * | 4/2006 | Winters et al. | 717/168 |
| 2006/0184717 A1 * | 8/2006 | Rothman et al. | 711/103 |
| 2010/0058046 A1 * | 3/2010 | John et al. | 713/2 |
| 2011/0138142 A1 * | 6/2011 | Lomnes | 711/163 |

* cited by examiner

*Primary Examiner* — Isaac Tecklu
(74) *Attorney, Agent, or Firm* — Troy A. Van Aacken

(57) ABSTRACT

Systems and methods are provided for downloading updated software from a head end to a cable modem that writes to flash memory an updated operating system code without overwriting the preexisting application code portion and also without overwriting the preexisting operating system code portion. Updated application code is not written until the updated operating system code has been verified as error-free.

24 Claims, 4 Drawing Sheets

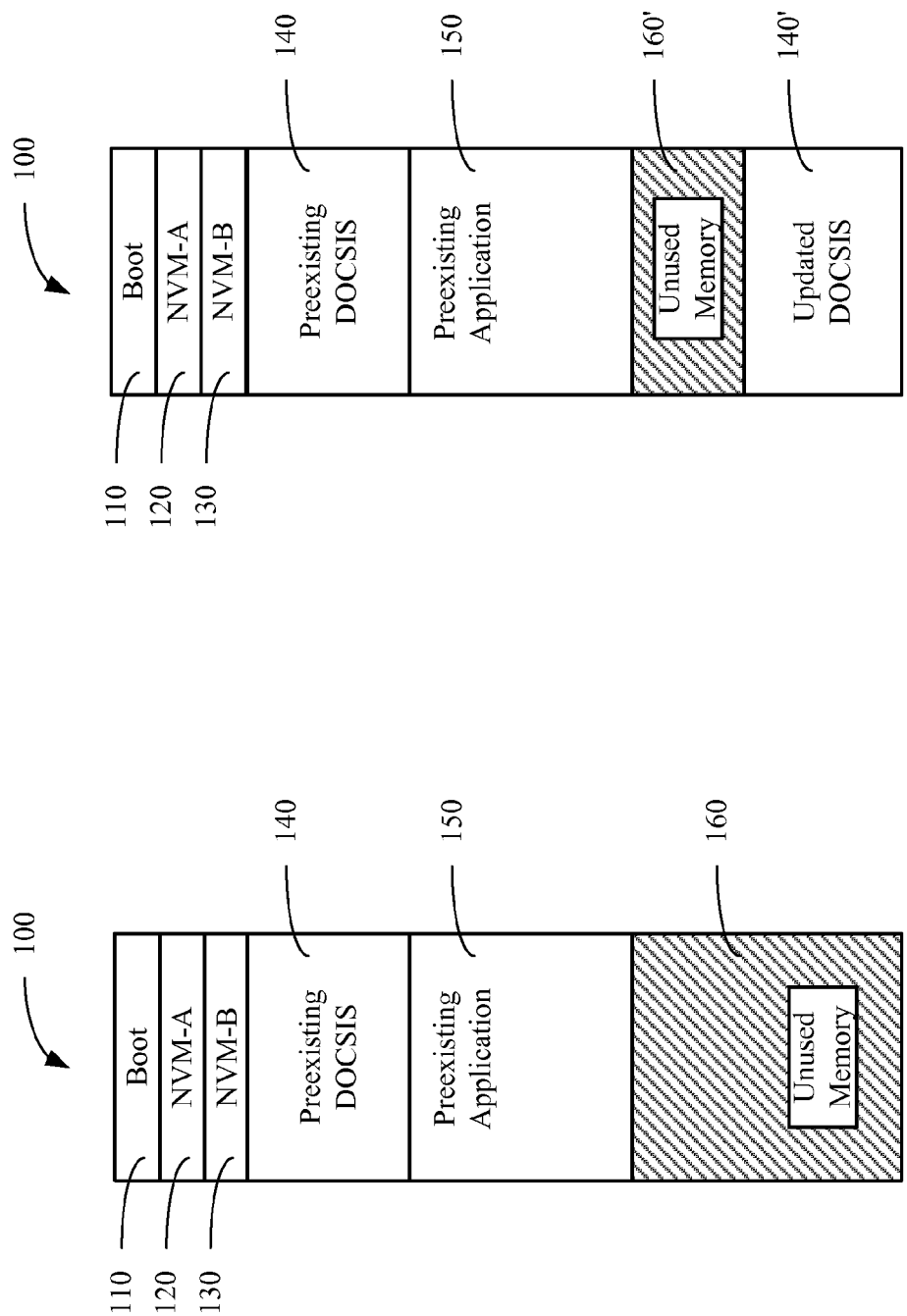

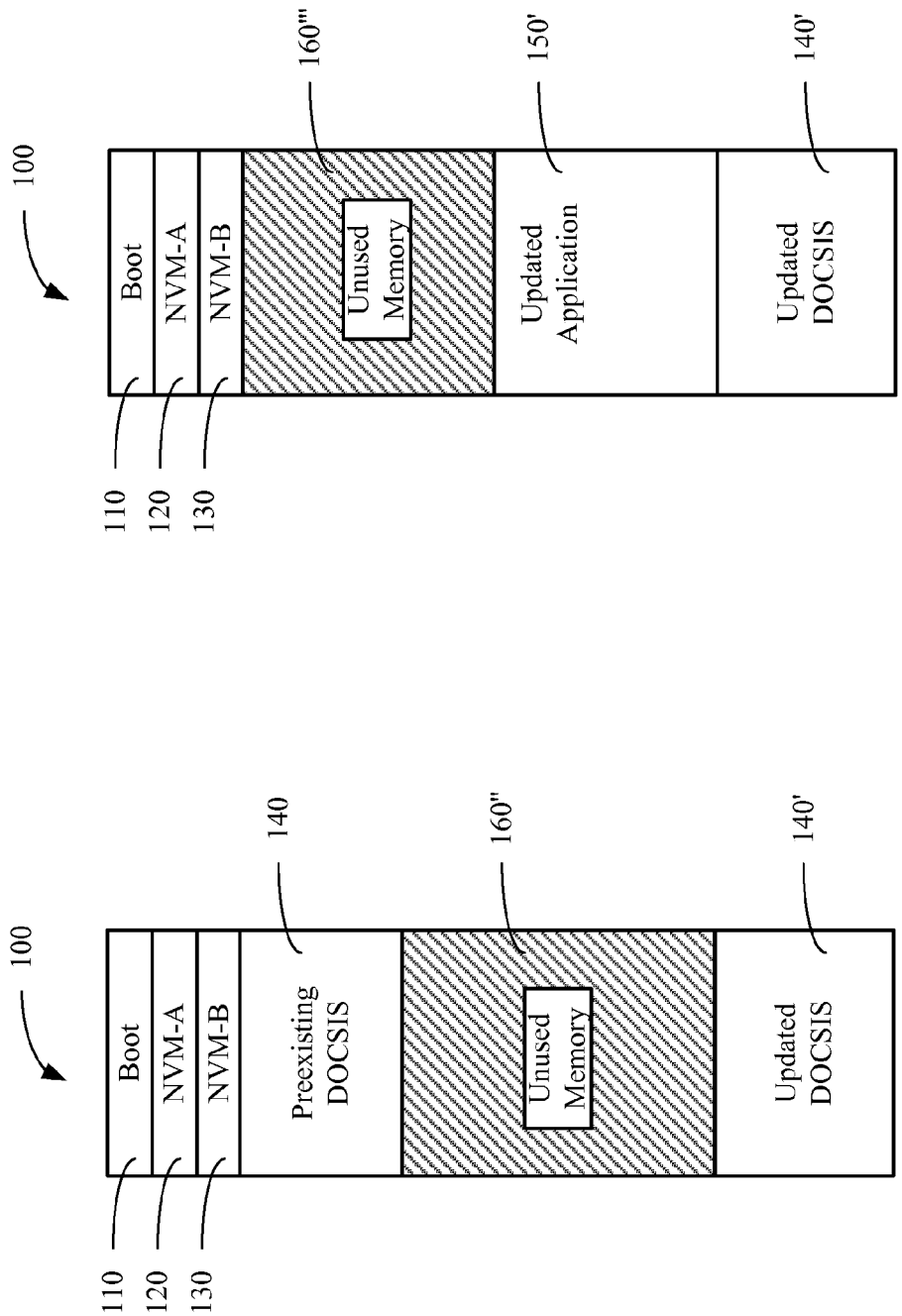

PREVENTING OVERWRITE OF NONESSENTIAL CODE DURING ESSENTIAL CODE UPDATE

CROSS-REFERENCE TO RELATED APPLICATIONS

This application claims the benefit under 35 U.S.C. §119 (e) of U.S. Provisional Patent Application Ser. No. 61/032,674, entitled "Method For Preventing Overwriting Of Essential Code During An Update," filed Feb. 29, 2008, which is incorporated herein by reference as if set forth herein in its entirety.

TECHNICAL FIELD

The present invention relates generally to communication devices and, more particularly to preventing the overwriting of non-essential code during an update to essential code of a network communication device.

BACKGROUND

Network interface devices, such as cable modems, are one way that multiple services operators ("MSO") have been meeting the demand for increased bandwidth capabilities in delivering information over networks from a central location, such as a head end, to users, such as residential and commercial end users. To facilitate such information delivery, standards have been developed that allow equipment from different manufacturers to operate, or 'talk' to one another. The predominant standard used in the cable modem industry is known as Data Over Cable Service Interface Specification ("DOCSIS"), for use in delivering digital data, such as Internet information, to users over the existing coaxial lines of the Community Antenna Television system ("CATV"), which has been delivering cable television programming to users at least since the 1960's.

Currently, DOCSIS requires that when the software operating system loaded on a cable modem is remotely updated with a new or different version of software code over the network, the cable modem should be capable of recovering from an incomplete download and update procedure without the need for MSO personnel to manually update and restart the modem. In such a scenario, an MSO will typically change a software load's filename in the configuration file that is downloaded from the head end to the cable modem when the modem ranges and registers (range and register are terms known in the art). The cable modems then individually request new software corresponding to the updated filename from the head end.

It will be appreciated that this process is used in the DOCSIS systems, but other applications may use a broadcast download routine. In addition, another method for downloading updated software code to a cable modem in a DOCSIS system is known in the art as Simple Network Management Protocol ("SNMP"). SNMP allows the MSO to set various parameters on a cable modem remotely. Thus, an MSO can set the new filename of a new software load on a cable modem and then instruct the cable modem to download the software. Thus, personnel of the MSO need not physically visit a MSO subscriber's premises to upgrade, update or otherwise modify a given cable modem's operating system or other application software. An example of other application software that may be implemented by a cable modem includes PacketCable software for facilitating voice telephony over the cable modem system.

The specifications for DOCSIS, as well as PacketCable™, require that a cable modem be able to recover from an unsuccessful download and update procedure, which may be caused by a power loss during downloading and updating of code. If the code is only partially downloaded and updated when a power loss occurs, then the partial code could render the modem inoperable.

To overcome the potential inability to reboot a cable modem after loss of code that may occur when the power loss occurs, cable modems are typically engineered to accommodate two copies of the code. Each copy includes the operating system code as well as applications code. Thus, if a given code is interrupted during download, the modem is not rendered inoperable because the second copy of the code—as existed before the download process started—can be used to reboot the cable modem after power has been restored. Upon boot-up, the code is typically loaded from a flash memory device into random access memory ("RAM"). If the operating system sought by the system upon boot-up has been corrupted, then the system loads the second copy, or 'backup.' Although this 'dual banking' scheme provides adequate protection against an incomplete or corrupt download of updated software, a drawback is that twice the amount of flash memory space is required to store two separate and complete sets of code in a compressed format, each set comprising both operating and applications code. Since the cost of the flash memory used in cable modems is not insignificant, the overall cost is increased for a cable modem designed to use the dual banking scheme as compared with a modem that does not require storage of two separate and identical copies of code. In addition, since two copies must be maintained, the size of either the DOCSIS operating system code portion, as well as whatever applications software may be stored is limited. For example, a typical software load in a cable modem may include the DOCSIS portion using 1.2 megabytes ("MB") and the applications portion comprising 1.0 MB. While these are just examples, they illustrate typical load sizes for the DOCSIS operating system and application code, such as, for example, PacketCable™, respectively.

Since flash memory is typically manufactured having storage capacity sizes in powers of two, a 4 MB flash memory chip could not store two copies of software used in a typical dual banking scheme. Thus, an 8 MB flash memory device is typically used to accommodate the two software load copies. Only 4.4 MB plus the boot loader sector and non-volatile memory ("NVM") sectors for each bank are used, leaving approximately 3 MB unused. This inefficient use of the flash memory capacity in a dual banking system results in typically higher costs.

Thus, there is a need for an improved method of downloading updated code from a Cable Modem Termination System ("CMTS") head end to a cable modem that preserves the invulnerability of the modem against an incomplete download of updated software, which could result in the cable modem being stuck in a DOCSIS only mode. Furthermore, there is a need for an improved method of downloading and updating such program code that preserves the capability for operating the previously existing application code if the new operating system code is inoperable.

SUMMARY

Briefly described, and according to one embodiment, the present invention is directed towards methods for preventing the overwriting of non-essential code sections during an update to essential code of a network communication device.

It is an object of the present invention to provide a method for downloading updated software from a head end to a cable modem that writes in flash memory an updated operating system code without overwriting the preexisting application code portion and also without overwriting the preexisting operating system code portion. Further, the application code is not written until the updated operating system code has been verified as error-free. It will be appreciated that 'operating system code,' as used herein, refers to essential code, which includes not only operating system software, but other core code for operating the cable modem in a DOCSIS-compliant manner. Thus, the phrases 'operating system code' and 'essential code' are used interchangeably herein. If the updating operation is interrupted prior to completion, for example, due to a power failure prior, an RF interruption, or a corrupted download prior to completion of updating the operating system, then the cable modem can reboot using the existing operating system and the existing application code.

In such a scenario, download of the cable modem's operating system code and application code portions—both code portions are typically downloaded together—is performed again, because there is not a complete, usable copy of the new code in the cable modem's flash memory. When the operating system has been programmed to flash memory, the updated software is verified, using a CRC check, for example, to ensure that it was not corrupted during the download process. Then, after the updated download of operating system code has been verified, the older version of the application code (the version that is 'preexisting' while the updated version is being downloaded) is partially or fully overwritten by an updated version of application code.

Accordingly, with each new software load, the updated operating system is written to an unused memory area, so as not to overwrite the preexisting operating system code or the preexisting application code until the writing of the updated operating system code has been verified.

It will be appreciated that there are not two physically fixed areas that exist in flash memory for the two types of code, essential (operating system) and nonessential (application). Rather, the concept of first and second areas is merely used to illustrate and describe the location relationship of the essential code to the nonessential code, as stored at any given time in the flash memory device.

In particular, it is an object of the present invention to provide a method for updating the software of a network communication device, the method comprising (a) receiving the updated software code from a head end device, wherein the updated software code includes an essential code portion and a nonessential application code portion; and (b) upon a determination that sufficient storage capacity exists within a flash memory device for the essential code portion while maintaining a preexisting essential code portion and a preexisting nonessential application code portion therein: (i) writing the essential code portion to the flash memory device such that both the preexisting essential code portion and the preexisting nonessential application code portion are not overwritten by the essential code portion, (ii) verifying that the essential code portion has been written to the flash memory device without error, (iii) updating a first pointer with an address corresponding to the essential code, (iv) writing the nonessential application code portion to the flash memory device such that the preexisting essential code portion is not overwritten, and (v) updating a second pointer with an address corresponding to the nonessential application code.

It is a further object of the present invention that upon determination that the updated essential code portion was not accurately written to the flash memory device, receiving the updated software code again from a head end device.

It is a further object of the present invention that upon failure of an attempt to write the essential code portion to the flash memory device, the network communication device can operate with the preexisting essential code portion and the preexisting nonessential application code portion without the need for re-download of existing software code.

It is a further object of the present invention that the network communication device is a cable modem.

It is a further object of the present invention that the nonessential application code portion includes code for operating a telephony device.

It is a further object of the present invention that the nonessential application code portion includes PacketCable™ code.

It is a further object of the present invention to boot the network communication device from the preexisting essential code portion after a loss of power to the device that occurs while updating the software load and before the verifying step.

It is a further object of the present invention that after a loss of power, RF interruption, corrupted download, or other events that occur while updating the software load of the network communication device and before the verifying step, the updated software code is re-sent from the head end device, whereupon the updating of the software load begins again.

It is a further object of the present invention to verify that the nonessential application code portion has been written to the flash memory device without error.

It is a further object of the present invention to provide a method for updating the software of a network communication device, the method comprising: (a) receiving the updated software code from a head end device, wherein the updated software code includes an essential code portion and a nonessential application code portion, (b) determining that sufficient storage capacity exists within a flash memory device for the essential code portion while maintaining a preexisting essential code portion and a preexisting nonessential application code portion therein, (c) writing the essential code portion to the flash memory device such that both the preexisting essential code portion and the preexisting nonessential application code portion are not overwritten by the essential code portion, and (d) writing the nonessential application code portion to the flash memory device such that the preexisting essential code portion is not overwritten.

A system for updating the software of a network communication device, the system comprising: (a) a head end device for providing updated software code, wherein the updated software code includes an essential code portion and a nonessential application code portion, and (b) a network communication device comprising a flash memory device, the network communication device coupled to the head end device through a network and configured to: (i) receive the updated software code from the head end device, and (ii) upon a determination that sufficient storage capacity exists within the flash memory device for the essential code portion and also maintain a preexisting essential code portion and a preexisting nonessential application code portion therein: write the essential code portion to the flash memory device while the preexisting essential code portion and the preexisting nonessential application code portion are not overwritten, verify that the essential code portion has been written to the flash memory device without error, update a first pointer with an address that corresponds to the essential code, write the nonessential application code portion to the flash memory device such that the preexisting essential code portion is not overwritten, and update a second pointer with an address that corresponds to the nonessential application code.

It is a further object of the present invention that the network communication device is configured to request the updated software code again from the head end device upon a determination that essential code portion was not accurately written to the flash memory device.

It is a further object of the present invention that the network communication device is configured to operate with the existing essential code portion and the existing non-essential application code portion upon failure to write the updated essential code portion to the flash memory device, such that a re-download of existing software code is unnecessary.

It is a further object of the present invention that the network communication device is a cable modem.

It is a further object of the present invention that the nonessential application code portion includes code for operating a telephony device.

It is a further object of the present invention that the nonessential application code portion includes PacketCable™ code.

It is a further object of the present invention that the network communication device boots from the existing essential code portion after a loss of power to the device that occurred while updating the software load and before verification of the updated essential code portion.

It is a further object of the present invention that the network communication device requests that the updated software code be re-sent from the head end device such that the updating of the software load starts again.

It is a further object of the present invention that the network communication device verifies that the updated non-essential application code portion has been written to the flash memory device without error.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 1A is a diagram illustrating the memory allocation for existing essential code and non-essential code in a flash memory device.

FIG. 1B is a diagram illustrating the memory allocation in a flash memory device after download and writing of updated essential code.

FIG. 1C is a diagram illustrating the memory allocation in a flash memory device after clearing unused memory corresponding to the updated non-essential code.

FIG. 1D is a diagram illustrating the memory allocation in a flash memory device after download and writing of updated non-essential code.

DETAILED DESCRIPTION

Figure 2:
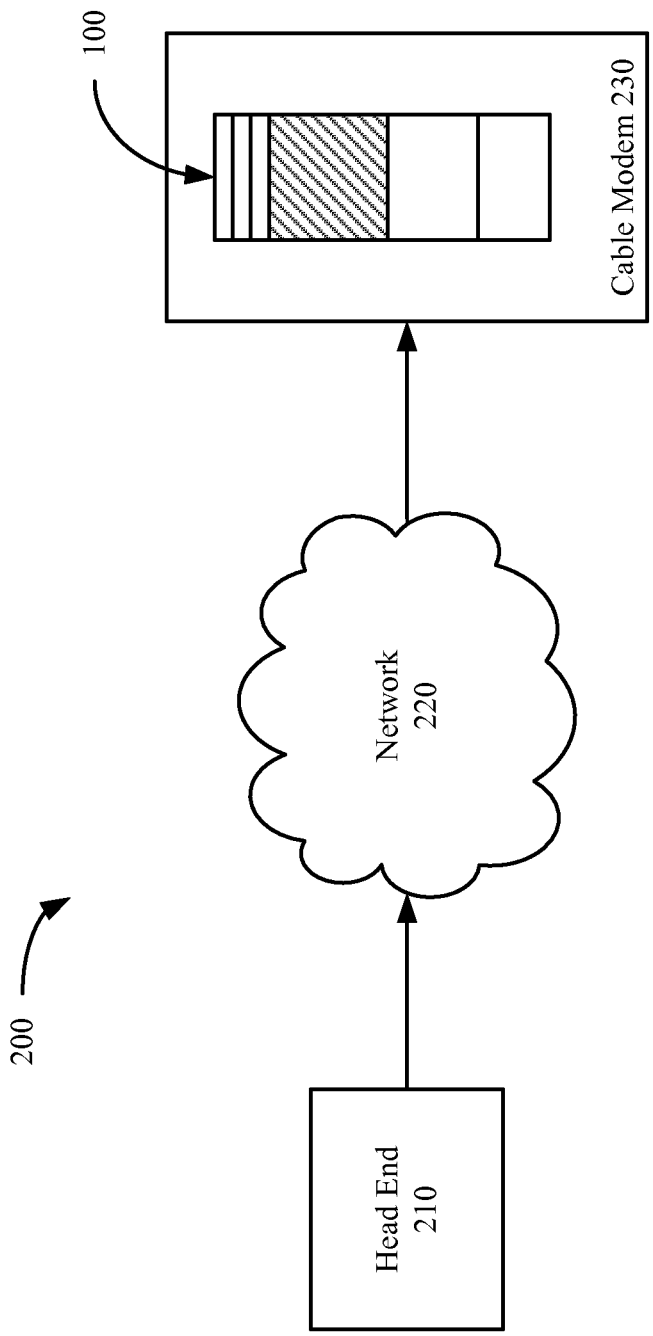
FIG. 2 is a diagram illustrating the download of essential and non-essential code from a head end through a network to the flash memory device of a cable modem.

Reference is now made in detail to the description of the embodiments for preventing the overwriting of non-essential code sections during an update to essential code of a network communication device. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

In the present invention systems and methods are described for downloading and updating the software code in the flash memory device of a network communication device such as a cable modem. Flash memory devices as described herein typically comprise a boot area, two sectors of non-volatile memory, and the remainder of the memory includes operating system code, application code and unused memory.

A software load for downloading and updating the code in the flash memory is divided into two sections, (1) updated operating system code and (2) updated application code. The flash memory device does not contain enough memory for two complete copies of the software code. The present invention describes use of the available memory of the flash memory device in a manner that overloads some of the flash memory while also preventing the overwriting of any of the preexisting code during the update to the operating system code.

It should be appreciated that the operating system part of the software load has enough information (self-contained code) that the network communication device can still operate if the operating system is the only valid code. The device can still boot, range-and-register to establish communication with the head end, and then re-download the software load (start over with the update).

FIG. 1A is a diagram illustrating the memory allocation in a flash memory device (stack) 100. The flash memory device 100 is divided into a plurality of sectors including a boot sector 110, two non-volatile memory (NVM) sectors NVM-A 120 and NVM-B 130, operating system code (DOCSIS) 140, application code 150, and unused memory sectors 160. In this document, the term "DOCSIS code" is used interchangeably with the terms such as "essential code," "essential program," "operating system code" or "critical code." Likewise, the term "application code" is used interchangeably with the terms such as "nonessential code," "nonessential program," "nonessential application program," "nonessential application code," or "noncritical code," for example. It should be readily appreciated that code for other operating systems could also be used and the use of DOCSIS for the specific examples discussed herein are intended to be non-limiting. The flash memory device 100 shown in FIG. 1A includes the DOCSIS code 140 and the application code 150 together with unused (free, available) memory sectors 160 loaded in a typical configuration. Depending on previous downloads of the DOCSIS code 140 and the application code 150, the location of the respective code portions could be different than that shown in FIG. 1A. Indeed, FIG. 1C illustrates a different location of the code portions within the flash memory device 100, following an update of the respective DOCSIS code 140 and application code 150 portions. While the DOCSIS code 140 and the application code 150 will typically be allocated within the flash memory device 100 in accordance with FIG. 1A or FIG. 1D during normal usage, it is possible for other allocations to occur.

Referring again to FIG. 1A, DOCSIS code 140 and application code 150 sections are allocated within the available portions of the flash memory device 100. The DOCSIS code 140, as essential code (an operating system) is critical to the operation of a network communication device. A cable modem is one non-limiting example of a network communication device. It is within the scope of the present invention that the network communication device could be any type of network communication device including a stored program controlled apparatus. Such devices typically include communication ports, as well as various types of volatile and non-volatile memory. The DOCSIS code 140 is one non-limiting example of essential code that is necessary for operation of a cable modem. The application code 140 is non-essential code that operates within a network communication device.

The non-volatile memory sectors are pointers to the beginning byte address of the first sector where the existing DOCSIS code 140 and the first sector of the existing application code 150 are stored. NVM-A 120 and NVM-B 130 each contain pointers to both code portions. Typically, NVM-B 130 is a backup copy of the pointers stored in NVM-A 120.

FIG. 1B is a diagram illustrating the memory allocation in the flash memory device 100 after download and writing of the updated DOCSIS code 140'. Before writing the updated DOCSIS code 140', the unused memory sectors are cleared. The updated DOCSIS code 140' is written into a portion of the unused memory 160 and is not allowed to overwrite either the existing DOCSIS code 140 or the existing application code portion 150. Failed updates to a network communication device, such as a cable modem, can be caused by power loss, device reset or a corrupted software load. If the update fails for any reason—leaving the updated DOCSIS code 140' inoperable—the network communication device can revert back to the existing DOCSIS code 140 and the existing application code 150.

It will be appreciated that prior to writing the updated software load to the flash memory device 100, some sectors of the unused memory are erased to allow for the writing of the respective update portion. For example in FIG. 1B, after the updated software load is received, the size of the updated DOCSIS code 140' is determined from information extracted from the headers of the downloaded file. The cable modem then determines where to write the updated DOCSIS code 140' by checking to ensure that writing will not overwrite either the existing DOCSIS code 140 or the existing application code 150. Once the check is complete, the appropriate sectors of the unused memory 160 are erased, and then the DOCSIS code 140' is written to the flash memory device 100.

It will be appreciated that after the updated DOCSIS code 140' is written, the portion of unused memory 160' accounts for separate smaller portions of the flash memory device.

After the DOCSIS code 140' has been stored and then verified in the flash memory device 100, a routine erases and then writes updated pointer information to the sections of the dedicated NVM areas containing the load pointers. A pointer is written pointing to the updated DOCSIS code 140' and a blank pointer is written relative to the application code 150 image in NVM-A. Once NVM-A is written, the same information is written to NVM-B (backup pointers). Thus, both NVM sectors contain pointers to the new operating system image at this juncture, but contain no pointers to an application image.

FIG. 1C is a diagram illustrating the memory allocation in the flash memory device 100 after erasing unused memory corresponding to the updated non-essential code. The space needed for the updated application code 150' is determined in the same manner as for the operating system code. The size of the application code image is determined from information extracted from the headers of the downloaded file. The cable modem then determines where to write the updated application code 150' and the appropriate sectors of the unused memory 160" are erased.

FIG. 1D is a diagram illustrating the memory allocation in the flash memory device 100 after download and writing of updated non-essential code. Once the appropriate sectors of the unused memory 160" are erased, the application code 150' is written to the flash memory device 100. Again, after the application code 150' has been written, the updated application code pointers are written to the NVM areas containing the load pointers. The new application code pointer is written to NVM-A. After the application code pointer has been written and verified to NVM-A, the same information is written to NVM-B. At this point, both NVM sectors contain pointers to both the new DOCSIS code 140' and the new application code 150'.

After the pointers are verified, the previously existing DOCSIS code 140 becomes part of the unused memory 160'''. The cable modem then resets itself and reboots with the new software load.

It will be appreciated that when erasing flash memory before the updated code is written, the number of sectors erased is typically only the number needed for writing that particular update. Thus, although the portions of flash memory indicated as "unused" may potentially be erased, typically only the portions corresponding to the particular update are actually erased. However, if all the space labeled as "unused" in FIGS. 1A-1B were actually needed, then those sectors would be available for the writing of updated code.

FIG. 2 is a diagram of a system 200 for the download of essential code and non-essential application code from a head end 210 through a network 220, such as a cable TV network, to a cable modem 230. The updated software load comprising essential code and non-essential application code are downloaded from the head end 210 through the network 220, and are typically programmed directly to the flash memory during download to the cable modem 230. (A small RAM buffer is used during the download.) The cable modem 230 includes a flash memory device 100.

A network communication device such as the cable modem 230 is coupled to the head end device 210 through the network. During download of the updated software load, the cable modem 230 attempts to update the software code in the flash memory device 100. In order to update the software code, the flash memory device 100 requires sufficient free memory to write the updated essential code portion while maintaining the existing essential code portion and the existing non-essential application code portions. For a cable modem 230, the updated essential code portion is typically an updated DOCSIS operating system. The updated DOCSIS operating system is written to the flash memory device 100 without overwriting the existing DOCSIS operating system or the existing application code. To reiterate, neither essential code nor non-essential code are overwritten when the updated essential code is written to the flash memory device 100.

After writing the updated DOCSIS code (essential code) to the flash memory device 100, the cable modem 230 verifies that the updated DOCSIS code has been written to the flash memory device 100 accurately. Once the updated DOCSIS code is verified as accurate then the updated application code (non-essential code) is written to the flash memory device 100. After the updated application code is verified as accurate, the cable modem resets itself and then reboots into the new software load.

Figure 3:
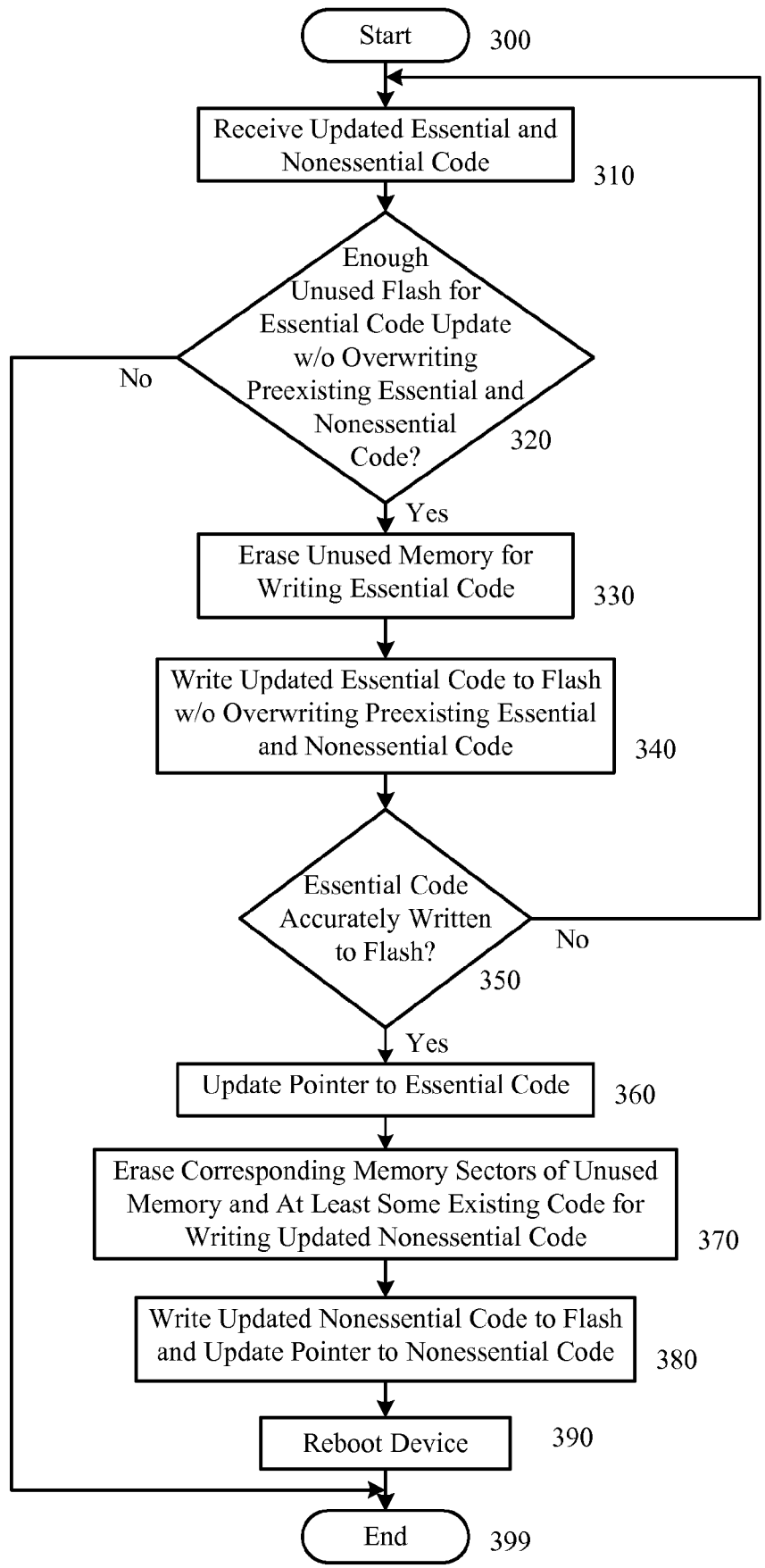
FIG. 3 is a flowchart illustrating the updating of essential and non-essential code in a flash memory device while preventing the overwriting of non-essential code when writing the updated essential code.

FIG. 3 is a flowchart illustrating a method 300 for updating essential code (DOCSIS, operating system) and non-essential code (application) in a flash memory device while preventing the overwriting of essential code or non-essential code when writing the updated essential code. At step 310, a software load containing respective code portions for updated essential code and updated application code are downloaded into a cable modem. It will be readily appreciated that the respective updated essential code and non-essential code portions can be separately downloaded, separated but downloaded simultaneously, or combined into a single software load, for example. It will also be readily appreciated that the cable modem 230 is one non-limiting example of network communication devices that are capable of utilizing the present invention. Each respective code portion in the software load includes headers containing markers indicating the respective sizes thereof.

The software load is typically received at the cable modem 230 in response to a request for updated software, or as a result of an automatic sending of the code downstream from a head end 210. During download of the updated essential code and the updated non-essential code to the cable modem 230, the respective code portions are typically written to flash memory during the download.

At step 320, the flash memory is analyzed to determine whether there is enough non-dedicated (available) space to write the updated essential code. The existing essential code and the existing non-essential code are not considered available space, so there must be enough free memory for writing a compressed version of the updated essential code without overwriting the essential code and also without overwriting the non-essential code.

The size of the respective code portion to be written is determined based on information contained in headers included within each code portion update. Accordingly, each of the essential and non-essential code portions contain size information, among other data, in their respective header. It will be readily appreciated that the terms "compressed" and "uncompressed" are used to indicate that the executable code (including the operating system as well as application code) is stored in the flash memory in a compressed format, but is uncompressed when loaded into RAM for execution. However, when updated code is received from the head end, it is typically already compressed, and is typically stored into flash memory in this compressed format during the update procedure.

The writable capacity of the flash memory is typically determined applying absolute value and subtraction operations to the starting addresses of the existing essential code and the existing non-essential code to determine the difference between the two starting addresses. If the existing essential code begins at a lower address than the non-essential code, as in the 'normal' orientation arrangement shown in FIG. 1A, the result is then subtracted from the total non-dedicated memory. If the starting address of the non-essential code is lower, as in the 'inverted' orientation as shown in FIG. 1D, i.e., closer to the boot loader 110 and NVM dedicated sectors, than that of the essential code, then the difference can be compared directly with the size of the updated essential code, the size of which is typically given in a header thereof. If adequate space is not determined to exist, the process ends.

If, however, there is adequate space, in the unused memory for writing the updated essential code, the corresponding unused memory sectors of the flash memory are erased at step 330. Next, the updated essential code is written to the unused memory space at step 340.

Following the writing process, a verification of the updated essential code is performed at step 350 by an error checking routine, such as a CRC routine as is known in the art. If the error check does not indicate that a valid copy of the essential code has been written, the routine returns to step 310, and the cable modem requests that the head end resend the updated essential code. Following verification of a successful download and update, pointers to the starting address of the essential code are updated in each of the NVM sectors to point to the updated essential code. Thus, if a failure occurs within the cable modem before the verification step is completed, then on reboot the boot loader 110 reloads the existing essential code—code that was in operation before the update was attempted—and requests that the updated essential code be downloaded again from the head end 210. Example failures that can occur include a power loss, an RF interruption and a corrupted download, among others. If a valid copy of the updated essential code is verified, then at any time thereafter on reboot the cable modem will load the updated essential code into RAM based on the updated address pointer.

Upon verification that the written operating system update is a valid copy of the updated essential code that was sent by the head end, preparation is made for writing the updated non-essential code. The size of the memory space necessary for the updated non-essential code is determined based on information contained in headers included within the updated non-essential code portion. The corresponding unused memory sectors as well as part of the memory sectors of the existing non-essential code within the flash memory are then erased at step 360. Next, the updated non-essential code is written to the unused memory space at step 340. After verification of a successful download and update, pointers to the starting address of the non-essential code are updated in each of the NVM sectors to point to the updated non-essential code similar to the updating of the essential code pointers. It will be appreciated that a substantial amount of the unused memory space used for writing the non-essential code typically comprises space where the existing non-essential resided before the update was written at step 340 above. Accordingly, the orientation of the non-essential code location with respect to the location of the essential code alternates as compared to the orientation of these respective code portions that existed prior the update method 300 being performed.

Once the update is complete, the cable modem 230 resets itself and reboots with the new software load at step 380. The method ends at step 145.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for updating the software of a network communication device, the method comprising the steps of:
   receiving the updated software code from a head end device, wherein the updated software code includes an essential code portion and a nonessential application code portion; and
   upon a determination that sufficient storage capacity exists within a flash memory device for the essential code portion while maintaining a preexisting essential code portion and a preexisting nonessential application code portion therein:
      writing the essential code portion to the flash memory device such that both the preexisting essential code portion and the preexisting nonessential application code portion are not overwritten by the essential code portion;
      verifying that the essential code portion has been written to the flash memory device without error;
      updating a first pointer with an address corresponding to the essential code;
      writing the nonessential application code portion to the flash memory device such that the preexisting essential code portion is not overwritten; and
      updating a second pointer with an address corresponding to the nonessential application code.

2. The method of claim 1 further comprising the steps of:
   upon determination that essential code portion was not accurately written to the flash memory device:
      receiving the updated software code again from a head end device; and
      performing the determination steps again.

3. The method of claim 2 further comprising the step of, upon failure of an attempt to write the essential code portion to the flash memory device, operating the network communication device with the preexisting essential code portion and the preexisting nonessential application code portion without the need for re-download of preexisting software code.

4. The method of claim 1, wherein the network communication device is a cable modem.

5. The method of claim 1, wherein the nonessential application code portion includes code for operating a telephony device.

6. The method of claim 1, wherein the nonessential application code portion includes PacketCable™ code.

7. The method of claim 1 further comprising the step of, booting the network communication device from the preexisting essential code portion after a failure that occurred while updating the software and before the verifying step.

8. The method of claim 7 further comprising the step of, requesting that the updated software code be re-sent from the head end device, whereupon the updating of the software begins again.

9. The method of claim 7, wherein the failure is one of the following: a loss of power, an RF interruption, a corrupted download.

10. The method of claim 1 further comprising the step of, verifying that the nonessential application code portion has been written to the flash memory device without error.

11. A method for updating the software of a network communication device, the method comprising the steps of:
    receiving the updated software code from a head end device, wherein the updated software code includes an essential code portion and a nonessential application code portion;
    determining that sufficient storage capacity exists within a flash memory device for the essential code portion while maintaining a preexisting essential code portion and a preexisting nonessential application code portion therein,
    writing the essential code portion to the flash memory device such that both the preexisting essential code portion and the preexisting nonessential application code portion are not overwritten by the essential code portion; and
    writing the nonessential application code portion to the flash memory device such that the preexisting essential code portion is not overwritten.

12. A system for updating the software of a network communication device, the system comprising:
    a head end device for providing updated software code, wherein the updated software code includes an essential code portion and a nonessential application code portion; and
    a network communication device comprising a flash memory device, the network communication device coupled to the head end device through a network and configured to:
       receive the updated software code from the head end device; and
    upon a determination that sufficient storage capacity exists within the flash memory device for the essential code portion and also maintain a preexisting essential code portion and a preexisting nonessential application code portion therein:
       write the essential code portion to the flash memory device while the preexisting essential code portion and the preexisting nonessential application code portion are not overwritten;
       verify that the essential code portion has been written to the flash memory device without error;
       update a first pointer with an address that corresponds to the essential code;
       write the nonessential application code portion to the flash memory device such that the preexisting essential code portion is not overwritten; and
       update a second pointer with an address that corresponds to the nonessential application code.

13. The system of claim 12, wherein the network communication device is further configured to request the updated software code again from the head end device upon a determination that the essential code portion was not accurately written to the flash memory device.

14. The system of claim 13, wherein the network communication device is further configured to operate with the preexisting essential code portion and the preexisting nonessential application code portion upon failure of an attempt to write the essential code portion to the flash memory device, such that a re-download of preexisting software code is unnecessary.

15. The system of claim 12, wherein the network communication device is a cable modem.

16. The system of claim 12, wherein the nonessential application code portion includes code for operating a telephony device.

17. The system of claim 12, wherein the nonessential application code portion includes PacketCable™ code.

18. The system of claim 12 the network communication device is configured to boot from the preexisting essential code portion after a failure that occurred while updating the software and before verification of the essential code portion.

19. The system of claim 18 wherein the network communication device is configured to request that the updated software code be re-sent from the head end device such that the updating of the software starts again.

20. The system of claim 18, wherein the failure is one of the following: a loss of power, an RF interruption, a corrupted download.

21. The system of claim 12 wherein the network communication device verifies that the nonessential application code portion has been written to the flash memory device without error.

22. A method for installing an updated set of communication programs into a stored program controlled apparatus that includes a communication port and a memory by transmitting said updated set of programs to said apparatus via said port, with the aid of a preexisting set of communications programs already resident in said memory, where said preexisting set of programs contains a subset of programs that include preexisting essential programs, and said updated set of programs contain a subset of programs that include essential programs and nonessential application programs, comprising the steps of:
   installing the essential programs in a first area of said memory that do not contain the preexisting essential programs and also do not contain preexisting nonessential application programs, such that the preexisting essential programs and preexisting nonessential application programs are not overwritten;
   altering operation of said apparatus to execute the essential programs instead of the preexisting essential programs; and
   installing the nonessential application programs in a second area of said memory, said second area constituting memory locations not occupied by the essential programs.

23. The method of claim 22, further comprising the steps of:
   erasing said first area of said memory, said erasing step to be performed prior to said step of installing the essential programs into said first area of said memory; and
   erasing said second area of said memory, said erasing step to be performed after said step of altering operation of the apparatus and prior to said step of installing the remaining nonessential application programs of said updated set of communication programs.

24. The method of claim 22, wherein said step of altering operation of said apparatus to execute said essential programs is accomplished by updating a pointer to a byte address indicating a beginning sector of said essential programs to pass control of said apparatus to said essential programs.

* * * * *